W. & J. INGLIS.
Process and Apparatus for Preserving Eggs.
No. 212,007. Patented Feb. 4, 1879.
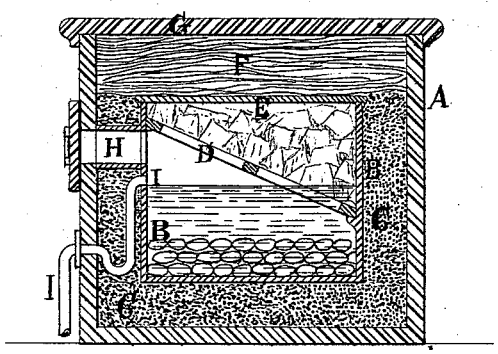
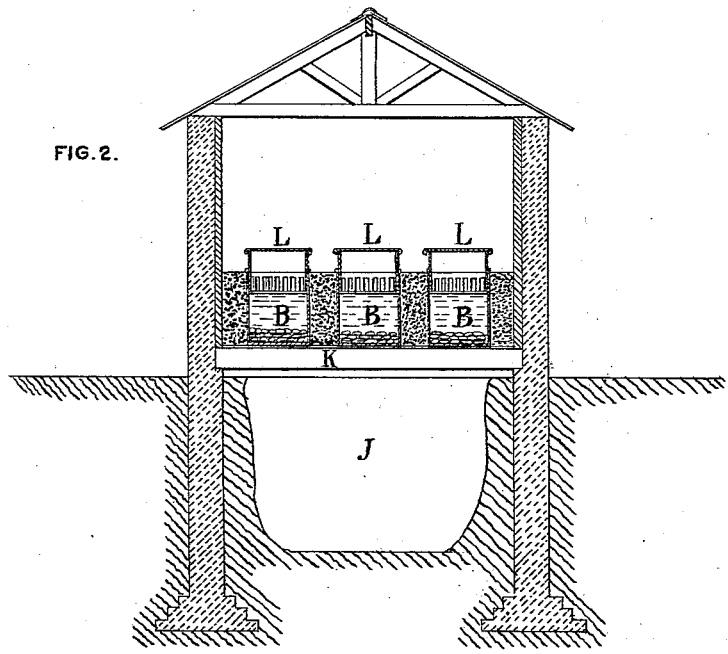
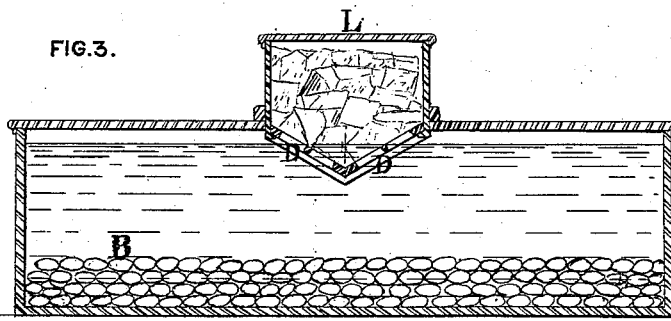

UNITED STATES PATENT OFFICE.

WILLIAM INGLIS, OF BOLTON, ENGLAND, AND JAMES INGLIS, OF MONTREAL, QUEBEC, CANADA.

IMPROVEMENT IN PROCESSES AND APPARATUS FOR PRESERVING EGGS.

Specification forming part of Letters Patent No. 212,007, dated February 4, 1879; application filed July 18, 1878.

*To all whom it may concern:*

Be it known that we, WILLIAM INGLIS, of Bolton, in the county of Lancaster, England, and JAMES INGLIS, of the city of Montreal, Province of Quebec, Canada, have jointly invented a certain new and useful Improvement in Preserving Eggs, of which the following is a specification:

The object of our invention is to preserve eggs in a simple and economical manner; and it consists, essentially, in keeping the eggs submerged in cold water protected from the action of the atmosphere, and in keeping the temperature to which they are subjected as uniform as possible, and as low as 32° Fahrenheit, or nearly so, by means of ice. In this manner eggs can be collected and stored when they are abundant, and be preserved in a practically fresh state until seasons of the year when they are ordinarily scarce or unobtainable.

The apparatus to be used in carrying out our invention in practice is obviously susceptible of considerable variety of form and arrangement. It is, however, in all cases desirable to economize the ice as much as possible, and for this purpose the preservative tanks or storing-vessels should be protected by non-conducting coverings from the penetration of heat.

Figure 1 of the accompanying drawings is a vertical section of a portable tank or storing-vessel suitable where the quantities to be dealt with are not very large. This preservative storing-vessel comprises an outer box or casing, A, and an inner box or tank, B, having between them a space, C, which is filled with sawdust or charcoal, or other suitable non-conducting material.

In the tank B there is fitted an inclined grid, D, which at its lower side dips below the intended surface-level of the water in the tank, and the ice is placed on the grid and gradually moves down it, so as to keep as much in the water as is required to maintain the desired low temperature. The tank B is covered by a lid, E, on which is placed a movable layer, F, of felt or other suitable non-conducting material, and an outer cover, G, closes the box A with its contents.

The cover G, felt layer F, and tank-lid E are made movable, to give access for renewing the supply of ice when necessary. Access is obtained to the part of the tank below the ice-grid D by a door, H, in the side, and an overflow-pipe, I, is provided for draining off water, which may rise above the desired level from the melting of the ice, or in consequence of the introduction of the eggs, such overflow-pipe being made with a trap to prevent the passage of air. If the water contains suspended matters, such matters are liable to become deposited on the eggs, and while in general such deposits will not injure eggs, any injury thereby may be avoided by placing the eggs in clear or filtered water in cans or other vessels immersed in the water of the tank.

Where larger quantities of eggs are to be dealt with than those for which the portable vessel shown in Fig. 1, and hereinbefore described, is suitable, then we prefer to employ a building such as is shown in transverse vertical section in Fig. 2 of the accompanying drawings. In this building an ice-store is combined with the other parts, such ice-store consisting simply of a pit, J, formed at the lower part, and by preference below the ground-level, and which is to be filled with ice in any convenient way. Above the ice-pit J a number of transverse beams or joists, K, are fixed, and on these beams boxes or tanks B are placed for holding the water and the eggs.

A longitudinal vertical section of one of the tanks B is shown in Fig. 3. Across the middle or at any convenient part of each tank B there is placed a box, L, for broken ice, the bottom of the box being made with inclined grids D, which allow of a suitable quantity of ice always dipping into the water, and by melting therein maintaining the desired low temperature. In this arrangement, the under sides of the tanks being exposed to the ice in the pit J, the necessary coldness of the water will be maintained with less labor, trouble, and renewal of the supply of ice in the upper ice-boxes, L.

The spaces between the tanks are by preference filled in with non-conducting material, and the sides and top of the room may be lined with non-conducting material; or the tanks B may be covered to protect them from heat, doors or movable covers being provided to give access when desired.

We do not claim the preserving of eggs by means of ice applied so as to freeze the same, nor do we claim the cooling or covering of eggs with any of the substances hitherto proposed for that purpose with the view of preventing the access of air; but

We claim as our invention—

1. The process of preserving eggs by keeping them covered with water, which is kept at a uniform temperature as low as 32° Fahrenheit, or nearly so, by means of ice immersed in such water, as hereinbefore set forth.

2. A preserving tank or vessel the lower part of which is adapted to contain water and the articles to be preserved, with an inclined ice grid or grids, the lower end of which extends slightly below the water-level, as described.

WILLIAM INGLIS.
JAMES INGLIS.

Witnesses to the signature of William Inglis:
JOHN JACKSON,
H. I. A. PERCIVAL.

Witnesses to the signature of James Inglis:
THOS. INGLIS,
CHARLES G. C. SIMPSON.